United States Patent
Okura et al.

(10) Patent No.: US 9,635,290 B2
(45) Date of Patent: Apr. 25, 2017

(54) SOLID-STATE IMAGE SENSING DEVICE AND ELECTRONIC DEVICE

(71) Applicant: Renesas Electronics Corporation, Kanagawa (JP)

(72) Inventors: Shunsuke Okura, Kanagawa (JP); Fukashi Morishita, Kanagawa (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 14/689,913

(22) Filed: Apr. 17, 2015

(65) Prior Publication Data
US 2015/0304578 A1 Oct. 22, 2015

(30) Foreign Application Priority Data

Apr. 21, 2014 (JP) .................................. 2014-087363

(51) Int. Cl.
*H04N 5/335* (2011.01)
*H04N 5/363* (2011.01)
*H04N 5/374* (2011.01)

(52) U.S. Cl.
CPC ............. *H04N 5/363* (2013.01); *H04N 5/374* (2013.01)

(58) Field of Classification Search
None
See application file for complete search history.

(56) References Cited

U.S. PATENT DOCUMENTS

| 2010/0026860 A1* | 2/2010 | Oshima | H04N 5/361 348/243 |
| 2011/0278652 A1* | 11/2011 | Shima | H04N 5/3598 257/291 |
| 2012/0154656 A1 | 6/2012 | Oike et al. | |

FOREIGN PATENT DOCUMENTS

JP 2012-129799 A 7/2012

* cited by examiner

*Primary Examiner* — Stephen Coleman
(74) *Attorney, Agent, or Firm* — McDermott Will & Emery LLP

(57) ABSTRACT

The present invention provides a technique for achieving higher picture quality of a captured image by reducing noise which occurs at the time of resetting in a solid-state image sensing device and the like. A pixel array in a solid-state image sensing device includes a plurality of pixels and includes an OB pixel region and an effective pixel region. The solid-state image sensing device has a signal processing unit outputting a pixel signal of each of the pixels in the effective pixel region on the basis of the signal level of a signal output from each of the pixels. The solid-state image sensing device obtains a signal without applying a reset signal to each of the pixels in the OB pixel region, obtains the difference between the signal and a signal of a pixel in the effective pixel region, and outputs an image signal.

5 Claims, 11 Drawing Sheets

SOLID-STATE IMAGE SENSING DEVICE AND ELECTRONIC DEVICE

CROSS-REFERENCE TO RELATED APPLICATIONS

The disclosure of Japanese Patent Application No. 2014-087363 filed on Apr. 21, 2014 including the specification, drawings and abstract is incorporated herein by reference in its entirety.

BACKGROUND

The present invention relates to a solid-state image sensing device and an electronic device having therein a solid-state image sensing device and, more particularly, relates to a technique for realizing higher picture quality.

An electronic device having therein an image sensor (solid-state image sensing device) is widely spread. The electronic device receives an operation of the user and generates a still image, a moving image, and the like. The user shares still images and the like generated by using those electronic devices with others user via a network or the like and performs communicates. In recent years, a mobile device having a camera module is being spread and chances that a high-quality image is generated are being increased.

An example of the solid-state image sensing device is a CMOS (Complementary Metal Oxide Semiconductor) image sensor. The CMOS image sensor includes, for example, a plurality of unit pixels arranged two-dimensionally. Each of the unit pixels has at least a photodiode, a transfer gate for transferring charges accumulated in the photodiode to a floating diffusion (FD) region, and a reset transistor for resetting charges in the floating diffusion region. In the image sensor, at the signal reading time, first, a signal processor reads a signal according to voltage in the floating diffusion region from each of the pixels (reading of signal level) and, next, reads, from each of the pixels, a signal according to a voltage when the charges in the floating diffusion region are reset (reading of reset level). The signal processor eliminates noise on the basis of the difference between the signal level and the reset level.

In the CMOS image sensor, to maintain synchronism of signal charge accumulation periods, a global shutter operation is performed. In the case of sequentially initializing the floating diffusion region before charge transfer on the row unit basis, there is a case that a voltage drop in the power supply of a reset transistor for initializing the floating diffusion region and a crosstalk between a reset signal line for supplying a reset signal to pixels in adjacent rows and the floating diffusion region occur.

To realize higher picture quality of such a solid-state image sensing device, for example, Japanese Unexamined Patent Application Publication No. 2012-129799 (patent literature 1) describes that in a CMOS image sensor, driving of a floating diffusion region by a reset transistor is controlled every plural rows which are not adjacent to each other in a pixel array unit before transfer of charges by a transfer gate.

RELATED ART LITERATURE

Patent Literature

Patent literature 1: Japanese Unexamined Patent Application Publication No. 2012-129799

SUMMARY

However, in the technique of the patent literature 1, reset noise at the time of resetting the floating diffusion region occurs in each of a signal level output from each pixel and a reset level. At the time of reading the signal level and the reset level from each pixel, since offsets in reading paths by columns of pixels arranged two-dimensionally are different, FPN (Fixed Pattern Noise) or shading occurs. Due to this, the S/N ratio (signal-noise ratio) of an image deteriorates.

Consequently, in a solid-state image sensing device or the like, a technique for achieving higher picture quality of a captured image by reducing noise at the time of resetting, FPN, and shading is required.

The other problems and novel features will become apparent from the description of the specification and appended drawings.

A solid-state image sensing device according to an embodiment has a pixel array, a control circuit, and a signal processing unit. The pixel array includes an OB (optical black) pixel region and an effective pixel region. The control circuit supplies a signal to each of pixels included in the pixel array to thereby control driving of each of the pixels. The signal processing unit outputs a pixel signal of each of the pixels in the effective pixel region on the basis of a signal level of a signal output from each of the pixels. The control circuit performs, on each of the pixels in the OB pixel region, a control of a supply timing of a drive signal for reducing noise caused by application of a reset signal for resetting charges held in each of the pixels. The signal processing unit receives an input of a signal from each of the pixels in the OB pixel region, obtains a signal level of each of the pixels in which noise caused by application of the reset signal is reduced, and outputs an image signal of each of the pixels in the effective pixel region on the basis of the difference between the obtained signal level and a signal level according to the charges accumulated in each of the pixels in the effective pixel region.

An electronic device according to an embodiment has a solid-state image sensing device. The electronic device has a processor and a memory. The solid-state image sensing device has a pixel array, a control circuit, and a signal processing unit. The pixel array includes an OB pixel region and an effective pixel region. The control circuit supplies a signal to each of pixels included in the pixel array to thereby control driving of each of the pixels. The signal processing unit outputs a pixel signal of each of the pixels in the effective pixel region on the basis of a signal level of a signal output from each of the pixels. The control circuit performs, on each of the pixels in the OB pixel region, a control of a supply timing of a drive signal for reducing noise caused by application of a reset signal for resetting charges held in each of the pixels. The signal processing unit receives an input of a signal from each of the pixels in the OB pixel, obtains a signal level of each of the pixels in which noise caused by application of the reset signal is reduced, and outputs an image signal of each of the pixels in the effective pixel region on the basis of the difference between the obtained signal level and a signal level according to the charges accumulated in each of the pixels in the effective pixel region. The memory is configured to store an image signal of each pixel output from the solid-state image sensing device. The processor is configured to perform an image process using the image signal stored in the memory.

By the solid-state image sensing device and the electronic device having the solid-state image sensing device according to an embodiment, by using a signal of the OB region in which noise caused by application of a reset signal is reduced, a process for achieving higher picture quality of an image (a process of correcting FPN, shading, or the like) can be performed in the signal processing unit, and the picture quality of an image can be increased.

DETAILED DESCRIPTION

Figure 1:
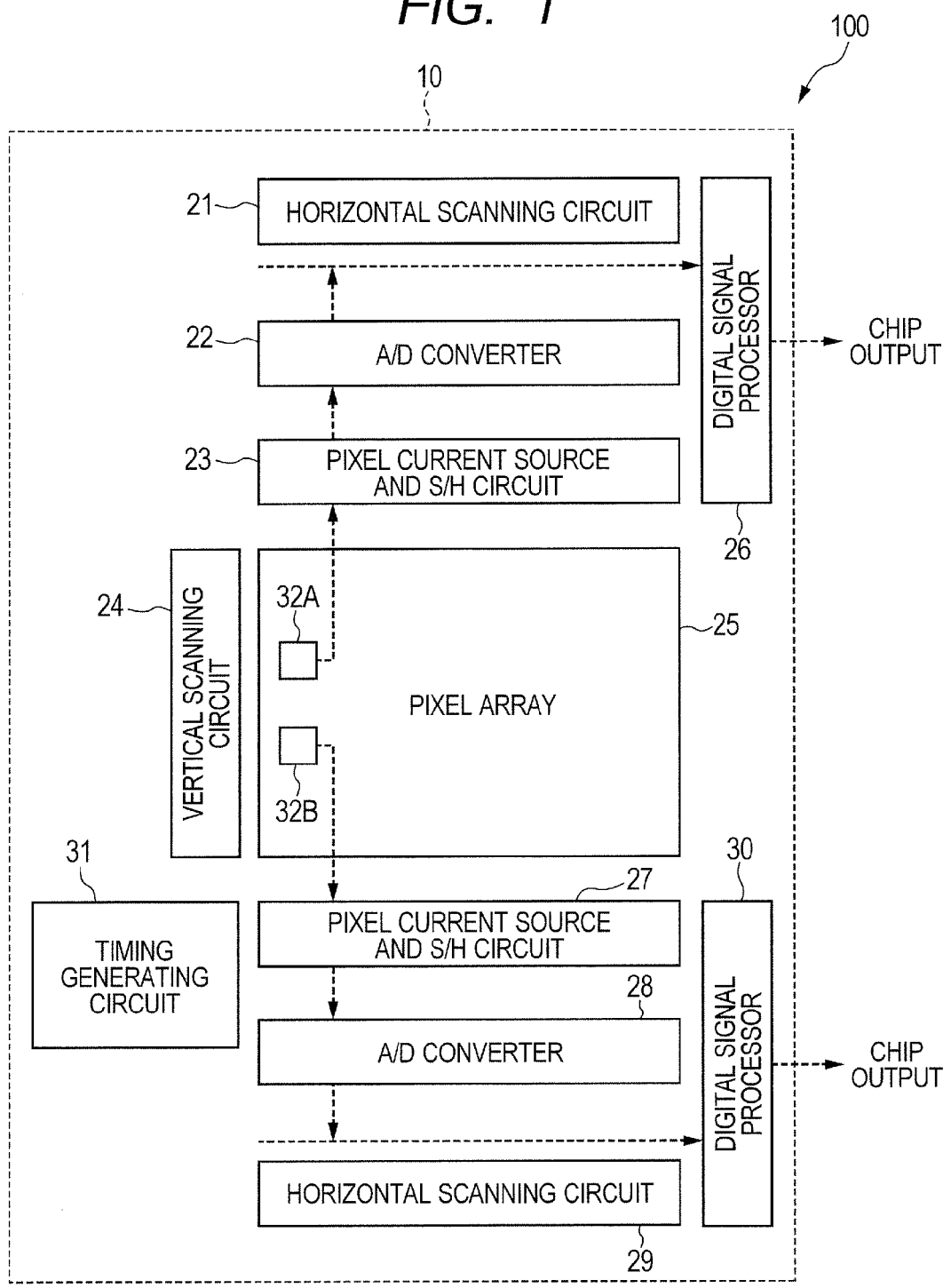
FIG. 1 is a block diagram illustrating the configuration of an electronic device 100 having a solid-state image sensing device of a first embodiment.

Hereinbelow, embodiments of the present invention will be described with reference to the drawings. In the following description, the same reference numerals are designated to the same parts. The names and functions of the parts are the same. Therefore, the detailed description of the parts will not be repeated.

First Embodiment

A solid-state image sensing device and an electronic device of a first embodiment will be described with reference to the drawings.
Configuration FIG. 1 is a block diagram illustrating the configuration of an electronic device 100 having a solid-state image sensing device of a first embodiment. The electronic device 100 performs a global shutter operation of making a timing of storing charges to pixels and a charge storage period synchronized. As illustrated in FIG. 1, a solid-state image sensing device 10 included in the electronic device 100 has a horizontal scanning circuit 21, an A/D (analog to digital) converter 22, a pixel current source and S/H circuit 23, a vertical scanning circuit 24, a pixel array 25, a digital signal processor 26, a pixel current source and S/H circuit 27, an A/D converter 28, a horizontal scanning circuit 29, a digital signal processor 30, and a timing generating circuit 31.

The pixel array 25 is configured by two-dimensionally arranging a plurality of pixels (in FIG. 1, pixels 32A and 32B are illustrated as apart of the pixels). As will be specifically described later, each of the pixels of the pixel array 25 includes a photoelectric conversion element and accumulates a charge in accordance with an incident light amount.

As illustrated in FIG. 1, the pixels included in the pixel array 25 are divided into two regions; an upper region and a lower region in the pixel array 25 in FIG. 1. The pixel 32A is a pixel included in the upper region, and the pixel 32B is a pixel included in the lower region. The pixels included in the upper region correspond to the pixel current source and S/H circuit 23, the A/D converter 22, the horizontal scanning circuit 21, and the digital signal processor 26. A signal of each of the pixels (for example, the pixel 32A) included in the upper region is transferred to the pixel current source and S/H circuit 23. The pixels included in the lower region correspond to the pixel current source and S/H circuit 27, the A/D converter 28, the horizontal scanning circuit 29, and the digital signal processor 30. A signal of each of the pixels (for example, the pixel 32A) included in the lower region is output to the pixel current source and S/H circuit 27.

The pixel array 25 includes drive lines for driving the pixels along the horizontal direction in FIG. 1. The pixel array 25 also includes vertical drive lines for driving the pixels along the vertical direction in FIG. 1. The solid-state image sensing device 10 has a row decoder, a column decoder, a power amplifier, and the like which are not illustrated and applies a drive signal to the drive lines in the row direction and the drive lines in the column direction in accordance with an address control signal for designating an address. In such a manner, the solid-state image sensing device 10 selects a pixel to be exposed or read and performs the exposure control on the selected pixel or the reading of a pixel signal.

The vertical scanning circuit 24 supplies a drive signal to each of the pixels to control transfer of charges to be accumulated in the pixel to the pixel current source and S/H circuit 23. The vertical scanning circuit 24 controls driving of each of the pixels at the time of exposure of the solid-state image sensing device 10 and driving at the time of reading signals from each of the pixels.

The vertical scanning circuit 24 is comprised of an address decoder or the like and drives all of the pixels in the pixel array 25 at once or drives the pixels on a row unit basis. The vertical scanning circuit 24 has a configuration for performing a read scan for reading signals from the pixels in the pixel array 25, a discharge scan for discharging charges in the pixels, a drive for discharging signals on all of the pixels in a lump, and a drive for reading signals on all of the pixels in a lump.

In the case where the solid-state image sensing device 10 performs a global shutter operation, the vertical scanning circuit 24 performs, for example, an operation of discharging signals of the pixels in a lump. In such a manner, the charges from the photoelectric conversion elements of the pixels are reset. The solid-state image sensing device 10 performs an electronic shutter operation and newly starts exposure. Each pixel includes a photoelectric conversion part and, by converting a light signal to a charge signal, holds a charge in the pixel. After completion of the exposure period, the vertical scanning circuit 24 performs the read scan of reading charges accumulated in the pixels, for example, on the row unit basis, thereby transferring a signal of a voltage (signal level) according to the accumulated charge from each pixel to the pixel current source and S/H circuit 23 or 27. The vertical scanning circuit 24 resets charges held in the pixels and transfers a signal of a voltage after the reset (reset level) and transfers the signal from each of the pixels to the pixel current source and S/H circuit 23 or 27. The signal according to the signal level and the signal at the reset level are held in an S/H circuit of the pixel current source and S/H circuit 23 or an S/H circuit in the pixel current source and S/H circuit 27.

The pixel current source and S/H circuits 23 and 27 generate constant current to be supplied to each of the vertical drive lines corresponding to the pixels in the pixel array 25. The pixel current source and S/H circuits 23 and 27 hold signals output from each of the pixels in the pixel array 25 (the signal of the signal level according to the charge accumulated in each pixel and the signal at the reset level) by the S/H circuit.

The A/D converter 22 receives an analog signal supplied from the pixel current source and S/H circuit 23 and converts the analog signal to a digital signal. The A/D converter 28 receives an analog signal supplied from the pixel current source and S/H circuit 27 and converts the analog signal to a digital signal. The A/D converters 22 and 28 are provided for each column of the pixels included in the pixel array 25. The A/D converters 22 and 28 perform A/D conversion on a certain pixel on the basis of the difference between the signal at the signal level according to the charge accumulated in the pixel and the signal at the reset level, thereby obtaining a digital pixel signal from which an offset of each pixel is removed.

The horizontal scanning circuit 21 sequentially transfers digital signals in each column held in the A/D converter 22 disposed for each of the columns of the pixel array 25 to the digital signal processor 26. The horizontal scanning circuit 29 sequentially transfers digital signals in each column held in the A/D converter 28 disposed for each of the columns of the pixel array 25 to the digital signal processor 30.

The digital signal processor 26 receives a digital signal transferred from the A/D converter 22 by control of the horizontal scanning circuit 21, performs a signal process, and outputs a signal after the signal process from the solid-state image sensing device 10. The signal process is, for example, a process of eliminating noise such as fixed pattern noise (FPN). The digital signal processor 30 receives a digital signal transferred from the A/D converter 28 by control of the horizontal scanning circuit 29, performs a signal process, and outputs a signal after the signal process from the solid-state image sensing device 10.

The timing generating circuit 31 generates a signal for controlling a timing of driving the vertical scanning circuit 24, the pixel current source and S/H circuit 23, and the like and controls the driving of the circuits of the solid-state image sensing device 10. The timing generating circuit 31 is comprised of a timing generator or the like.

Figure 2:
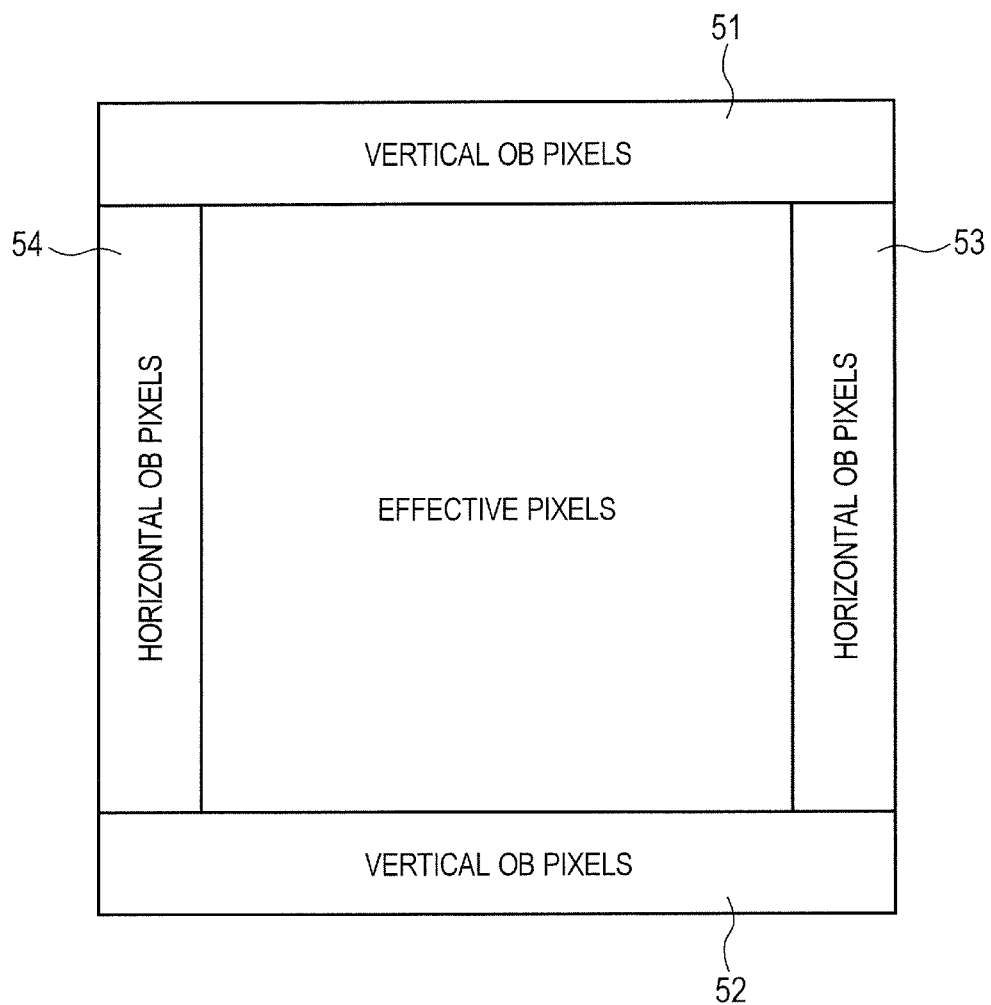
FIG. 2 is a diagram illustrating the configuration of pixels included in a pixel array 25.

FIG. 2 is a diagram illustrating the configuration of pixels included in the pixel array 25. As illustrated in FIG. 2, the pixel array 25 is comprised of an effective pixel region including effective pixels and an OB pixel region including OB (Optical Black) pixels.

The OB pixel region includes vertical OB pixels 51 and 52 and horizontal OB pixels 53 and 54. Each of the vertical OB pixels 51 and 52 is comprised of, for example, pixels in a few rows thousands of columns. Each of the horizontal OB pixels 53 and 54 is comprised of, for example, pixels in thousands of rows a few columns. The effective pixels included in the effective pixel region are, for example, pixels two-dimensionally arranged in thousands of rows by thousands of columns.

The solid-state image sensing device 10 blocks light by a metal wire or the like so that light does not incident on the pixels included in the OB pixel region. The pixels in the OB pixel region are used to obtain a signal level which becomes the reference of black. By correcting the signal level of each of the effective pixels included in the effective pixel region in accordance with the signal pixel of each of the pixels in the OB pixel region, the offset component of the effective pixel can be eliminated. For example, by subtracting the signal level of the pixel in the OB pixel region from the signal level of the effective pixel column by column of the pixels, noise such as fixed pattern noise (FPN) or shading can be eliminated column by column.

Figure 3:
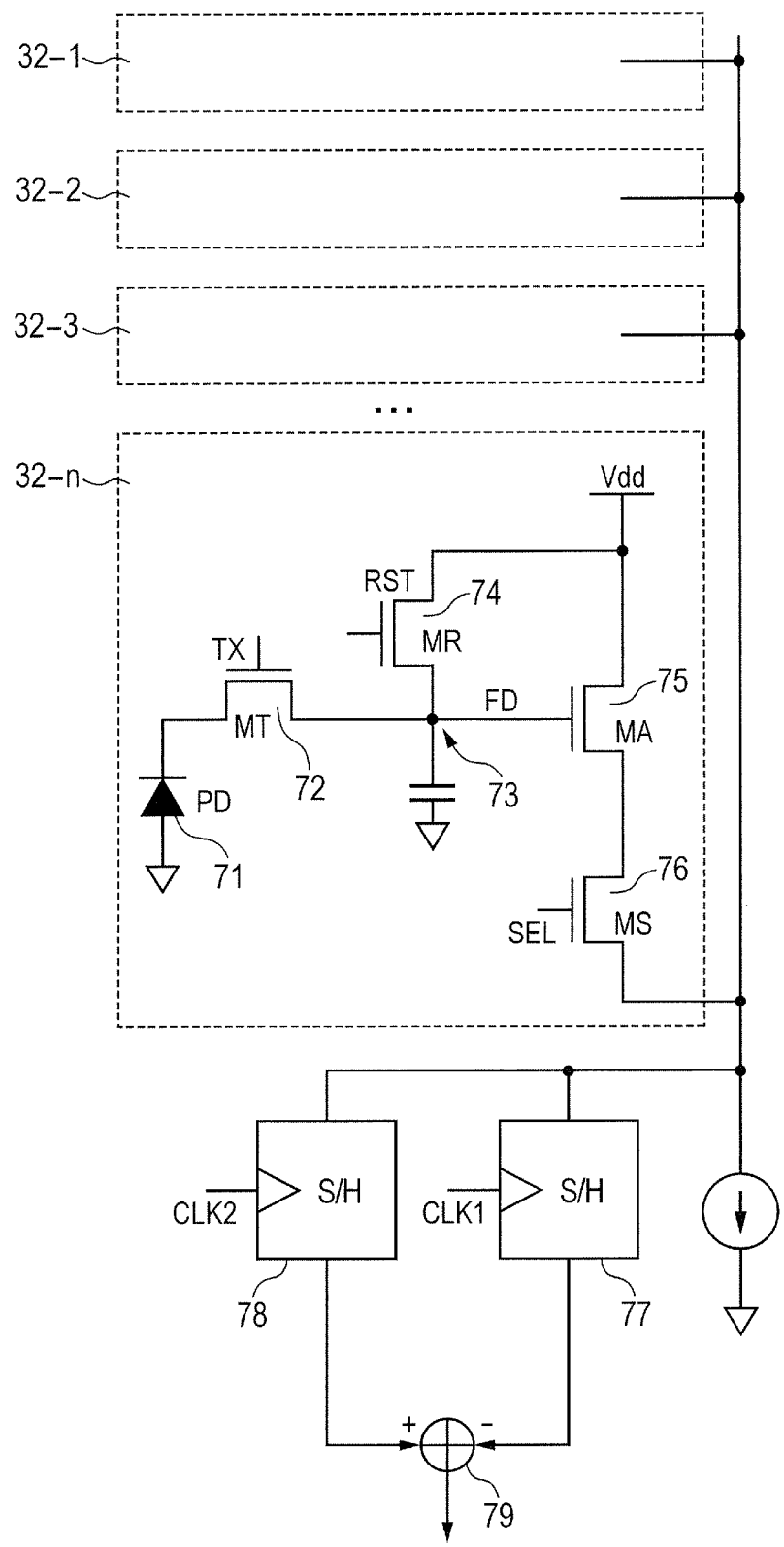
FIG. 3 is a diagram illustrating a detailed configuration of pixels and pixel current source and S/H (Sample and Hold) circuits.

FIG. 3 is a diagram illustrating a detailed configuration of pixels and the pixel current source and S/H (Sample and Hold) circuits. The example of FIG. 3 illustrates a column of arbitrary pixels in the pixel array 25 and the S/H circuits and the like corresponding to the column. As illustrated in FIG. 3, with the column made of pixels (N pieces of pixels 32-1, 32-2, 32-3, . . . and 32-n), an S/H circuit 77, an S/H circuit 78, and a differential amplification circuit 79 are associated. The pixel 32 (in FIG. 3, the details of the pixel 32-n are illustrated) includes a photodiode 71, a transfer gate 72, a floating diffusion region 73, a reset transistor 74, an amplification transistor 75, and a selection transistor 76.

The photodiode 71 (PD) receives light, generates charges according to the amount of light received, and accumulates the charges. The photodiode 71 functions as a photoelectric conversion unit. The anode of the photodiode 71 is grounded, and the cathode of the photodiode 71 is coupled to the source of the transfer gate 72.

The transfer gate 72 (MT) functions as a transfer unit for transferring the charges accumulated in the photodiode 71 to the floating diffusion region 73 in accordance with a drive signal TX. The drain of the transfer gate 72 is coupled to the drain of the reset transistor 74 and the gate of the amplification transistor 75. By the coupling point, the floating diffusion region 73 is configured.

The floating diffusion region 73 (FD) functions as a charge holding unit which receives the charge accumulated in the photodiode 71 and transferred via the transfer gate 72 and converts the charge to a voltage. In the case where the solid-state image sensing device 10 performs the global shutter operation, the floating diffusion region 73 holds the charges accumulated in the photodiode 71 during the exposure period.

The reset transistor 74 (MR) functions as a reset unit which resets the voltage held in the floating diffusion region 73. The source of the reset transistor 74 is coupled to a power supply voltage Vdd. For example, the reset transistor 74 turns on/off discharge of the charges accumulated in the floating diffusion region 73 in accordance with a drive signal RST supplied from the vertical scanning circuit 24. For example, when the drive signal RST at the high level is supplied, the reset transistor 74 clamps the floating diffusion region 73 at the power supply voltage Vdd. By the above, the charges accumulated in the floating diffusion region 73 are discharged (the voltage of the floating diffusion region 73 is reset). When the drive signal RST at the low level is supplied, the reset transistor 74 sets the floating diffusion region 73 into an electrically floating state.

The amplification transistor 75 amplifies the voltage according to the charge accumulated in the floating diffusion region 73 and outputs the amplified voltage (a signal at a signal level according to the voltage in the charge holding unit) to the vertical drive line via the selection transistor 76.

For example, the selection transistor 76 turns on/off output to the vertical drive line, of the voltage output from the amplification transistor 75 (a signal at a signal level according to the voltage of the charge holding unit) in accordance with the drive signal SEL supplied from the vertical scanning circuit 24. For example, when the drive signal SEL at the H level is supplied, the selection transistor 76 outputs the signal from the amplification transistor 75 to the vertical drive line. When the drive signal SEL at the L level is supplied, output to the vertical drive line, of the signal from the amplification transistor 75 is stopped. When the drive signal SEL supplied from the vertical scanning circuit 24 on the pixels in the N-th row is at the H level, an amplifier of a source follower (SF) type is formed by the amplification transistor 75 included in the pixel in the N-th row and the current source. A pixel signal in a row selected by the amplifier of the SF type is read and held in the S/H circuit (S/H circuit 77 or 78).

In the S/H circuit (in the example of FIG. 3, the S/H circuits 77 and 78), the timing of fetching a sample value is controlled by a clock signal. In the example of FIG. 3, the S/H circuit 77 holds a signal which is output from the amplification transistor 75 to the vertical drive line via the selection transistor 76 in accordance with a clock signal CLK1. The S/H circuit 78 holds a signal which is output from the amplification transistor 75 to the vertical drive line via the selection transistor 76 in accordance with a clock signal CLK2.

The clock signals are supplied from the vertical scanning circuit 24 to the S/H circuits 77 and 78 in accordance with a timing of outputting a signal at a signal level according to a charge accumulated in a pixel from the pixel and a timing of outputting a signal at the reset level. For example, the S/H circuit 77 receives the clock signal CLK1 at the timing of outputting the signal at the signal level according to the charge accumulated in each pixel. The S/H circuit 78 receives the clock signal CLK2 at the timing of outputting the signal at the reset level from each pixel.

The differential amplification circuit 79 outputs a signal indicating the difference between the signal level held in the S/H circuit 77 and the reset level held in the S/H circuit 78 to an A/D converter at the post stage (the A/D converter 22 or 28).

The A/D converter (the A/D converter 22 or 28) performs A/D conversion on a signal on the basis of the difference between the signal level and the reset level. By the operation, variation in the amplifier of the SF type can be eliminated.

Figure 4:
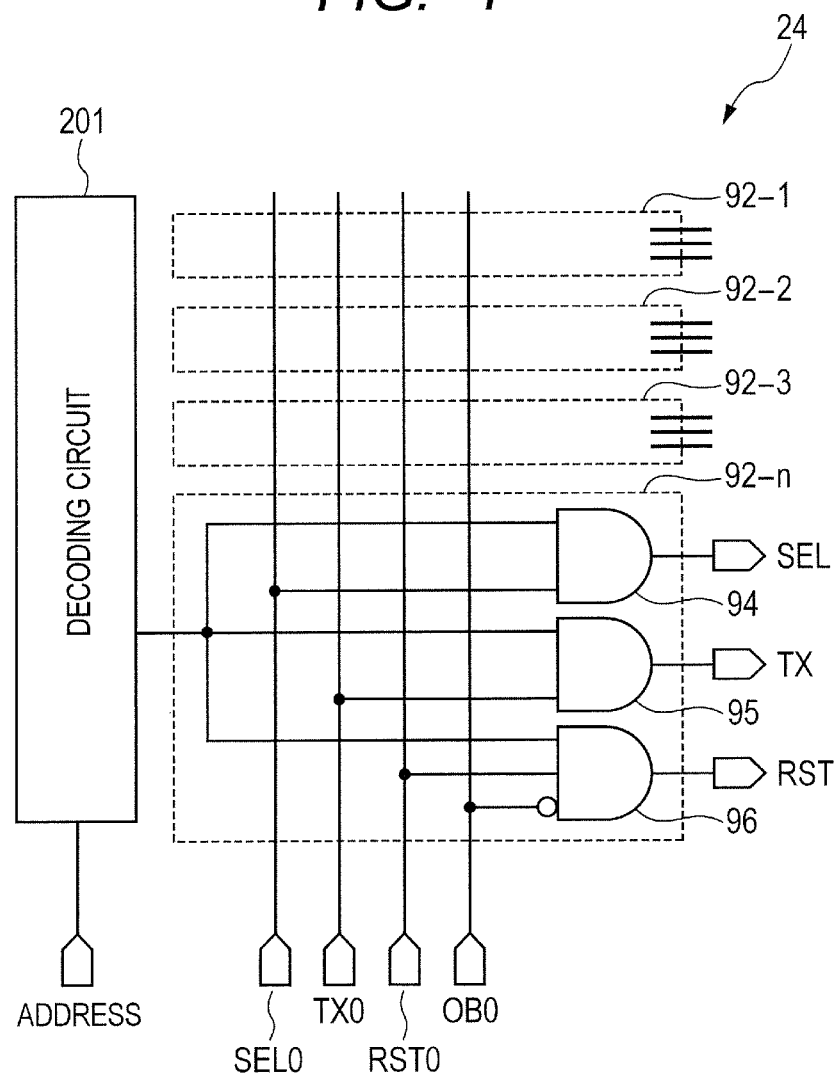
FIG. 4 is a diagram illustrating the configuration of a vertical scanning circuit 24.

FIG. 4 is a diagram illustrating the configuration of the vertical scanning circuit 24. The vertical scanning circuit 24 generates a drive signal for driving each of transistors included in the pixel 32 and supplies the signal to the pixel 32. As illustrated in FIG. 4, the vertical scanning circuit 24 includes, as main components, a decoding circuit 201 and AND circuit units (AND circuit units 92-1, 92-2, 92-3, . . . 92-n) provided in correspondence with the rows in the vertical scanning circuit 24. The decoding circuit 201 decodes an address signal input from the timing generating circuit 31 and selects a row in each pixel included in the pixel array 25. The decoded address signal is supplied to each of AND circuits included in the AND circuit unit 92.

A selection signal output unit 94 is a circuit for generating a drive signal SEL and supplying the generated drive signal SEL to each of pixels in a row corresponding to the AND circuit unit 92. The selection signal output unit 94 generates the drive signal SEL by obtaining AND between a signal indicative of a result of decoding the address signal from the decoding circuit 201 and a clock signal SEL0 supplied from the timing generating circuit 31.

A transfer signal output unit 95 is a circuit for generating a drive signal TX and supplying the generated drive signal TX to each of pixels in a row corresponding to the AND circuit unit 92. The transfer signal output unit 95 generates the drive signal TX by obtaining AND between a signal indicative of a result of decoding the address signal from the decoding circuit 201 and a clock signal TX0 supplied from the timing generating circuit 31.

A reset signal output unit 96 is a circuit for generating a drive signal RST and supplying the generated drive signal RST to each of pixels in a row corresponding to the AND circuit unit 92. The reset signal output unit 96 generates the drive signal RST by obtaining AND of a signal indicative of a result of decoding the address signal from the decoding circuit 201, a clock signal RST0 supplied from the timing generating circuit 31, and a control signal OB0 supplied from the timing generating circuit 31.

In the first embodiment, a signal obtained by inverting an output of the control signal OB0 is input to the reset signal output unit 96. That is, in the case where the control signal OB0 is at the H level, the reset signal is not output from the reset signal output unit 96 to a pixel being selected. In the case where the control signal OB0 is at the L level, a reset signal is output from the reset signal output unit 96 to a pixel being selected. That is, by not outputting the drive signal RST to pixels in the OB pixel region such as the vertical OB pixels 51 and 52, the timing generating circuit 31 reduces the influence of random reset noise accompanying a reset by the reset transistor 74.

Operation

Figure 5:
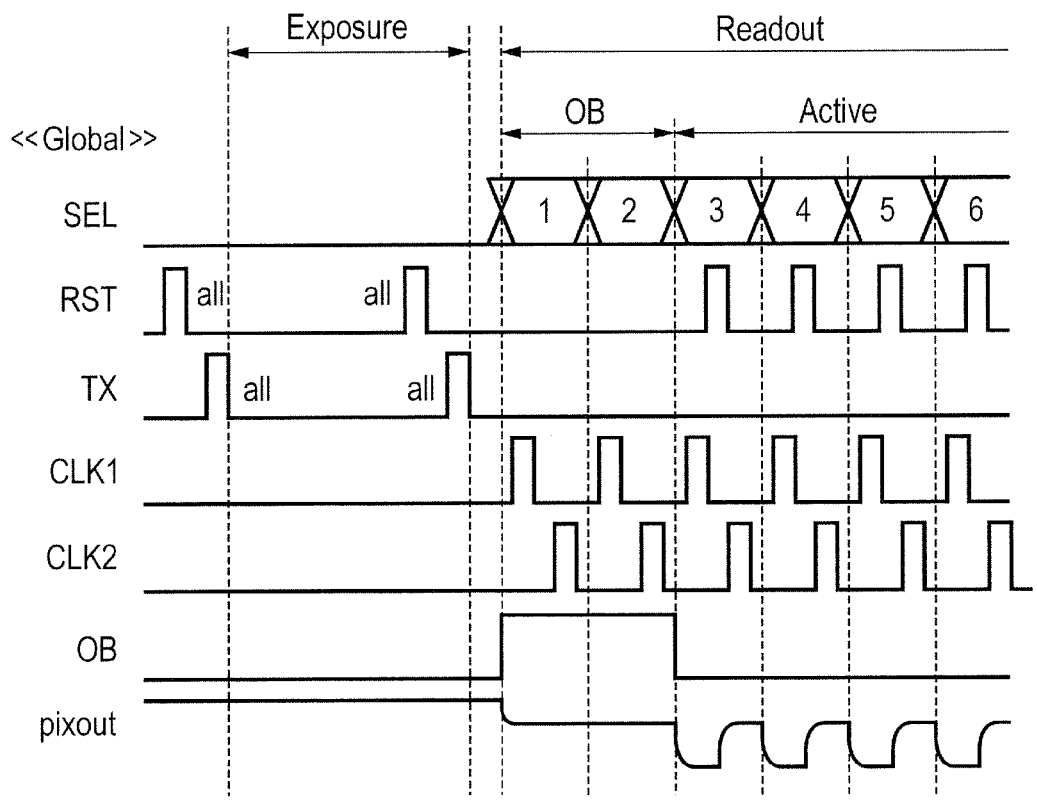
FIG. 5 is a diagram illustrating exposure control and pixel reading control in a first embodiment.

FIG. 5 is a diagram illustrating exposure control and pixel reading control in the first embodiment. The solid-state image sensing device 10 performs global shutter operation and accumulates charges by photoelectric conversion in pixels in the exposure period. The vertical scanning circuit 24 supplies different signals to the OB pixel region and the effective pixel region at a reading timing. A signal obtained by reducing reset noise is read from the OB pixel region and, on the basis of the difference between the read signal and a signal read from the effective pixel region, an image signal of each of pixels in the effective pixel region is output.

In FIG. 5, the horizontal axis indicates a time axis and depicts transition of the drive signals SEL, RST, and TX, the clock signals CLK1 and CLK2, the control signal OB, and a signal pixout of each pixel.

Before start of exposure, the vertical scanning circuit 24 shifts the drive signals RST of all of the pixels to the H level and short-circuits the node of the floating diffusion region 73 of all of the pixels to the power supply by the reset transistor 74. By the operation, the charges in the capacity of the floating diffusion region 73 are reset. The vertical scanning circuit 24 shifts the drive signal TX on all of the pixels to the H level and, by transferring all of the charges accumulated in the photodiode 71 to the floating diffusion region 73, resets the photodiode 71. From the time point the drive signal TX is shifted to the L level, the exposure period starts.

Before end of the exposure period, the vertical scanning circuit 24 shifts the drive signal RST on all of the pixels to the H level and resets the node of the floating diffusion region 73 of all of the pixels. The vertical scanning circuit 24 shifts the drive signal TX on all of the pixels to the H level, and the charges accumulated in the photodiode 71 are transferred to the floating diffusion region 73 and held in the floating diffusion region 73. By the operations, the solid-state image sensing device 10 realizes the global shutter function of exposing all of the pixels simultaneously.

After completion of the exposure period, the vertical scanning circuit 24 performs a reading operation for reading signals from the pixels. In the example of FIG. 5, a signal is read from the pixel 32A in the upper region of the pixel array 25. It is assumed that the first and second rows of pixels in the pixel array 25 are the OB pixel region (the region disposed in the vertical OB pixel 51 in FIG. 2) and the third and following rows are the effective pixel region. In the reading operation for reading signals from the pixels, the vertical scanning circuit 24 performs the reading operation row by row. In the case where the vertical canning circuit 24 reads signals from the pixels in the OB pixel region, by setting the control signal OB to the H level, the drive signal RST is not supplied to the pixel 32. Consequently, the vertical scanning circuit 24 makes signals having no reset noise held in the S/H circuits 77 and 78 from the pixels in the OB pixel region. A signal read from a pixel in the OB pixel region is A/D converted and the resultant signal is used to obtain the difference between the signal and the signal level of each of the pixels in the effective pixel region in the digital signal processor 26.

In the case of reading signals from the pixels in the effective pixel region (pixels in the third and following rows), by the clock signal CLK1, the vertical scanning circuit 24 makes a signal at a signal level according to the charges accumulated in the pixels held in the S/H circuit 77. After that, the vertical scanning circuit 24 supplies the drive signal RST to each pixel, resets the floating diffusion region 73 and, by the clock signal CLK2, makes a signal at the reset level held in the S/H circuit 78. The signals held in the S/H circuits are subjected to a signal process performed by a circuit at a post stage, and the resultant signals are output to the outside of the solid-state image sensing device 10. Similarly on the pixels in the fourth and subsequent rows, a signal at a signal level according to the charges accumulated in the pixels and a signal at the reset level are made held in the S/H circuits. Consequently, the solid-state image sensing device 10 can read an image signal row by row from the pixels. In the case where the pixel 32B in the lower region of the pixel array 25 is read, after completion of the exposure period, signals are sequentially read from the bottom side (the side closer to the pixel current source and S/H circuit 27) of the vertical OB pixels 52 illustrated in FIG. 2. Subsequently, the signals of the effective pixels are read in order from the bottom side. Therefore, after completion of the exposure period, signals from the vertical OB pixels 51 and 52 on the upper and lower sides are sequentially read in the same cycle (the OB period illustrated in FIG. 5). After that, signals from the upper region and signals from the lower region in the pixel array 25 are sequentially read in the same cycle (the active period in FIG. 5). It is similarly performed also in embodiments to be described later.

Summary of First Embodiment

As illustrated in FIG. 5, in the case of reading signals from pixels in the OB pixel region (in the example of FIG. 5, the pixels in the first and second rows), the vertical scanning circuit 24 does not shift the drive signal RST. By the operation, the signal level of low noise obtained by reducing the influence of reset noise can be read from the OB pixel region.

Different from the solid-state image sensing device 10 of the embodiment, in a manner similar to the effective pixel region, also on the OB pixel region, in the case of supplying the drive signal RST in the operation of reading signals from pixels, reset noise occurs in digital signals from pixels in the OB pixel region. Consequently, when subtraction is performed from a digital signal of each of the pixels in the effective pixel region by using the digital signals from the pixels in the OB pixel region, reset noise occurs.

On the other hand, in the solid-state image sensing device 10 of the first embodiment, reset noise may occur at the time of supplying the drive signal RST to all of the pixels in the exposure period. Consequently, in the reading operation for reading signals from the pixels, the solid-state image sensing device 10 samples the signal of the floating diffusion region 73 twice by the clock signals CLK1 and CLK2. That is, the solid-state image sensing device 10 obtains a digital signal from which reset noise was removed by performing A/D conversion based on the difference of the sampled signals. By performing subtraction from digital signals of the pixels in the effective pixel region by using the digital signal from which reset noise was removed with respect to the OB pixel region, the solid-state image sensing device 10 can remove noises such as FPN and shading.

Second Embodiment

Next, a solid-state image sensing device and an electronic device of a second embodiment will be described. In the second embodiment, the solid-state image sensing device 10 reads signals from the pixel in the OB pixel region a plurality of times. The digital signal processor 26 receives signals from the pixels in the OB pixel region a plurality of times and, for example, averages the signal levels on the basis of the signal levels of the signals received the plurality of times, thereby reducing noise in the signal levels of the pixels in the OB pixel region.

Figure 6:
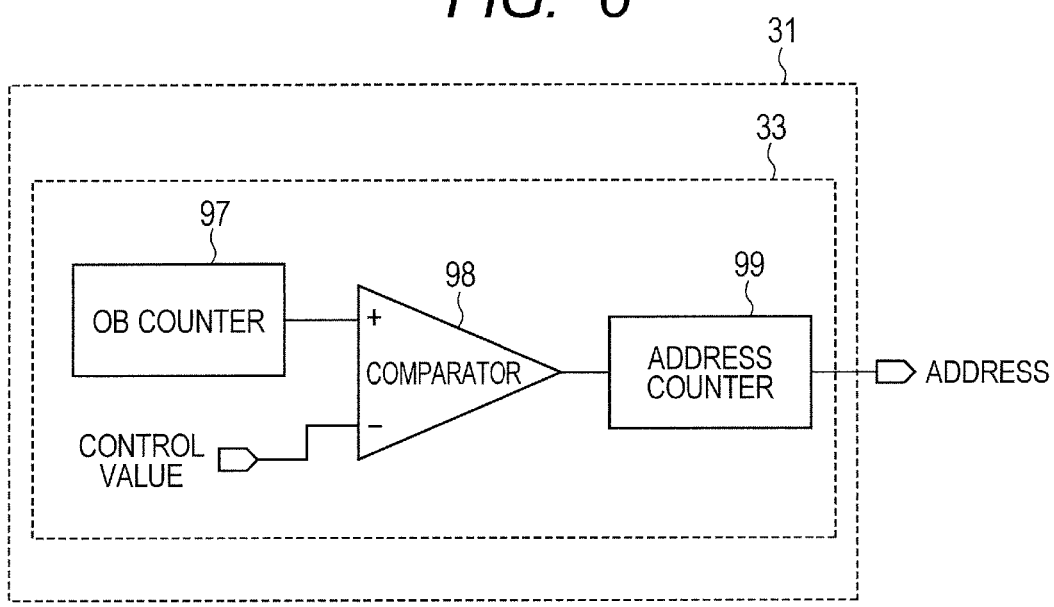
FIG. 6 is a diagram illustrating the configuration of an address generating unit 33 included in a timing generating circuit 31 in a solid-state image sensing device and an electronic device of a second embodiment.

FIG. 6 is a diagram illustrating the configuration of an address generating unit 33 included in the timing generating circuit 31 in the solid-state image sensing device and the electronic device of the second embodiment. As illustrated in FIG. 6, the address generating unit 33 includes an OB counter 97, a comparator 98, and an address counter 99. An address generated by the address generating unit 33 is output from the timing generating circuit 31 to the vertical scanning circuit 24.

The address counter 99 is a count-up counter and outputs addresses of columns of the pixel array 25 to the vertical scanning circuit 24.

The OB counter 97 is a sequential-count-up counter and outputs a count value to the comparator 98.

The comparator 98 receives an output value from the OB counter 97 and a predetermined control value and, when the output of the OB counter 97 is lower than the control value, outputs a signal for resetting the count value of the address counter 99 to the address counter 99. When the output of the OB counter 97 is higher than the control value, the comparator 98 stops the signal for resetting the address counter 99. By the above, the address counter 99 sequentially supplies the addresses of the columns to the vertical scanning circuit 24.

Operation of Second Embodiment

Figure 7:
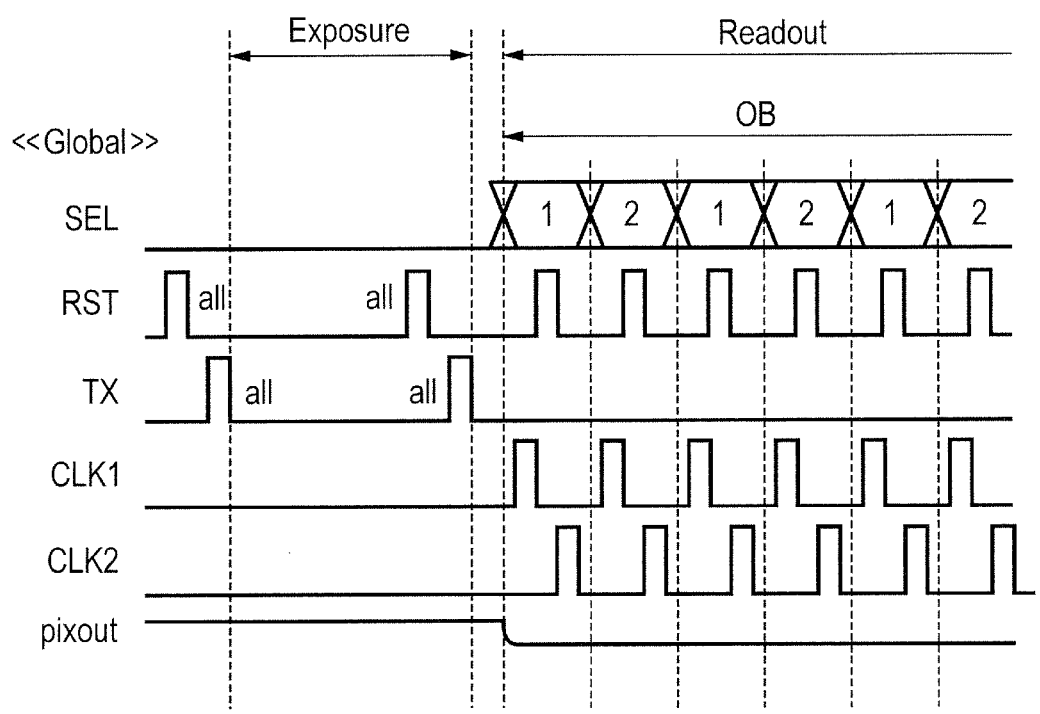
FIG. 7 is a diagram illustrating exposure control and pixel reading control in the second embodiment.

FIG. 7 is a diagram illustrating exposure control and pixel reading control in the second embodiment. As illustrated in FIG. 7, with respect to each of the pixels in the OB pixel region, the charges in the floating diffusion region 73 are reset by the drive signal RST in the reading period. Consequently, a signal read from each of the pixels in the OB pixel region may include reset noise.

In the second embodiment, in the case of reading signals from the pixels in the OB pixel region (in the example of FIG. 7, the pixels in the first and second rows), the solid-state image sensing device 10 reads signals from each of the pixels a plurality of times. In the example of FIG. 7, reading of signals from the pixels in the first and second rows as the pixels in the OB pixel region is performed a plurality of times.

Summary of Second Embodiment

Signals read from each of the pixels in the OB pixel region a plurality of times are A/D converted by the A/D converter 22 or 28. Digital data of each time obtained by the A/D conversion is averaged by the digital signal processor 26 or 30. By the averaging, reset noise and noise in the amplifier of the SF type and the S/H circuit is reduced from the signal levels of the pixels in the OB pixel region. By using the averaged digital data of the pixels in the OB pixel region, the solid-state image sensing device 10 performs subtraction column by column on digital data of the signal levels of the pixels in the effective pixel region by using the averaged digital data of the pixels in the OB pixel region. By the operation, noises such as FPN and shading can be eliminated from digital signals of the pixels in the effective pixel region.

Third Embodiment

Next, a solid-state image sensing device and an electronic device of a third embodiment will be described. In the third embodiment, different from the pixels in the effective pixel region, each of pixels in the OB pixel region receives an input of a bias voltage and outputs a signal according to the bias voltage to a vertical drive line in accordance with the drive signal SEL. The bias voltage is set close to the reset level of each of the pixels in the effective pixel region.

Figure 8:
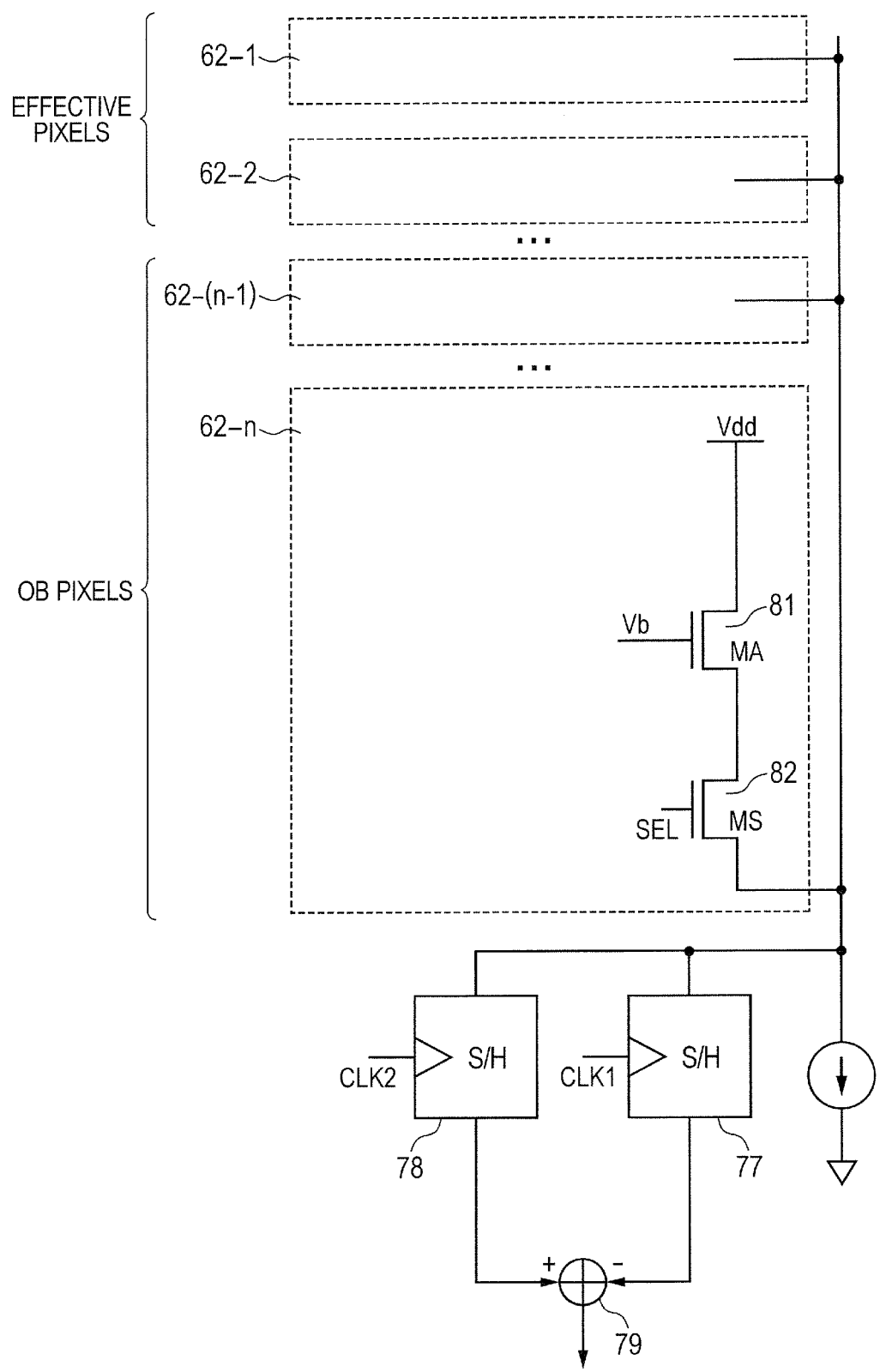
FIG. 8 is a diagram expressing the configuration of pixels in a third embodiment.

FIG. 8 is a diagram expressing the configuration of pixels in the third embodiment. In FIG. 8, unit pixels 62-1 and 62-2 are illustrated as pixels included in the effective pixel region, and unit pixels 62-(n−1) and 62-n are illustrated as pixels included in the OB pixel region. The unit pixels 62-1 to 62-n are in an arbitrary column in the pixels included in the pixel array 25.

Figure 9:
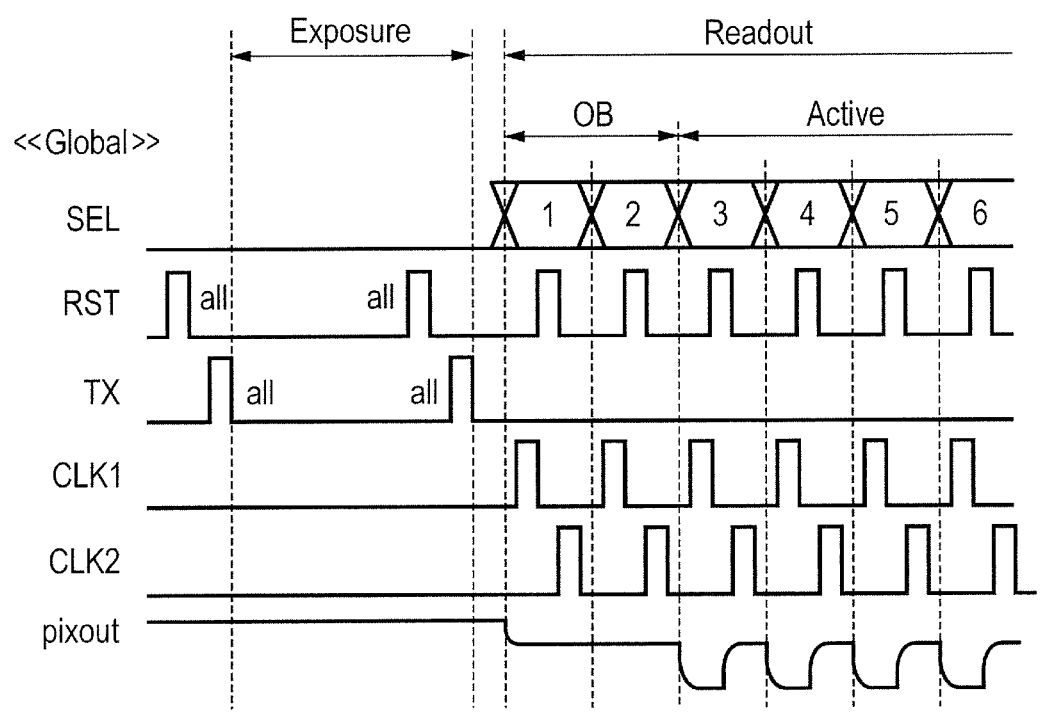
FIG. 9 is a diagram illustrating exposure control and pixel reading control in the third embodiment.

FIG. 9 is a diagram illustrating exposure control and pixel reading control in the third embodiment. Each of the pixels included in the OB pixel region (for example, the unit pixel 62-n) includes an amplification transistor 81 and a selection transistor 82. When the drive signal SEL supplied from the vertical scanning circuit 24 is at the H level in a row including the unit pixel 62-n, an amplifier of a source follower (SF) type is formed by the amplification transistor 81 and the selection transistor 82 in the unit pixel 62-n. Each of the pixels in the OB pixel region outputs a voltage from the amplifier of the SF type using a bias voltage Vb as input voltage to a vertical drive line.

With the unit pixel 62-n configured as described above, the vertical scanning circuit 24 does not supply the drive signal RST to each of the pixels in the OB pixel region. Both of a signal held in the S/H circuit 77 by the clock signal CLK1 and a signal held in the S/H circuit 78 by the clock signal CLK2 are outputs of the amplifier of the SF type using the bias voltage Vb as input voltage. Consequently, reset noise is not included in a result of the A/D conversion performed in the A/D converter 22 or 28 on the basis of the difference between the S/H circuits 77 and 78 obtained by the differential amplification circuit 79. By performing subtraction from digital data of the signal level of each of the pixels in the effective pixel region by using the result of the A/D conversion performed on the signal from each of the pixels in the OB pixel region by the digital signal processor 26 or 30, noise such as FPN or shading is eliminated and noise reduction can be achieved.

Summary of Third Embodiment

In the solid-state image sensing device and the electronic device of the third embodiment, the pixels in the OB pixel region do not include an element such as the photodiode 71 unlike the pixels in the effective pixel region. Consequently, it is unnecessary to supply the drive signals TX and RST and the like to the pixels in the OB pixel region, so that the area of the vertical scanning circuit 24 for driving the pixels in the pixel array 25 can be decreased.

Alternatively, control signals can be uniformly supplied to the pixels in the OB pixel region and the pixels in the effective pixel region. In this case, the configuration of the vertical scanning circuit 24 can be simplified. However, in this case, the drive signals RST and TX are not used to drive the pixels in the OB pixel region, so that they are used as floating outputs.

Fourth Embodiment

Next, a solid-state image sensing device and an electronic device of a fourth embodiment will be described.

Figure 10:
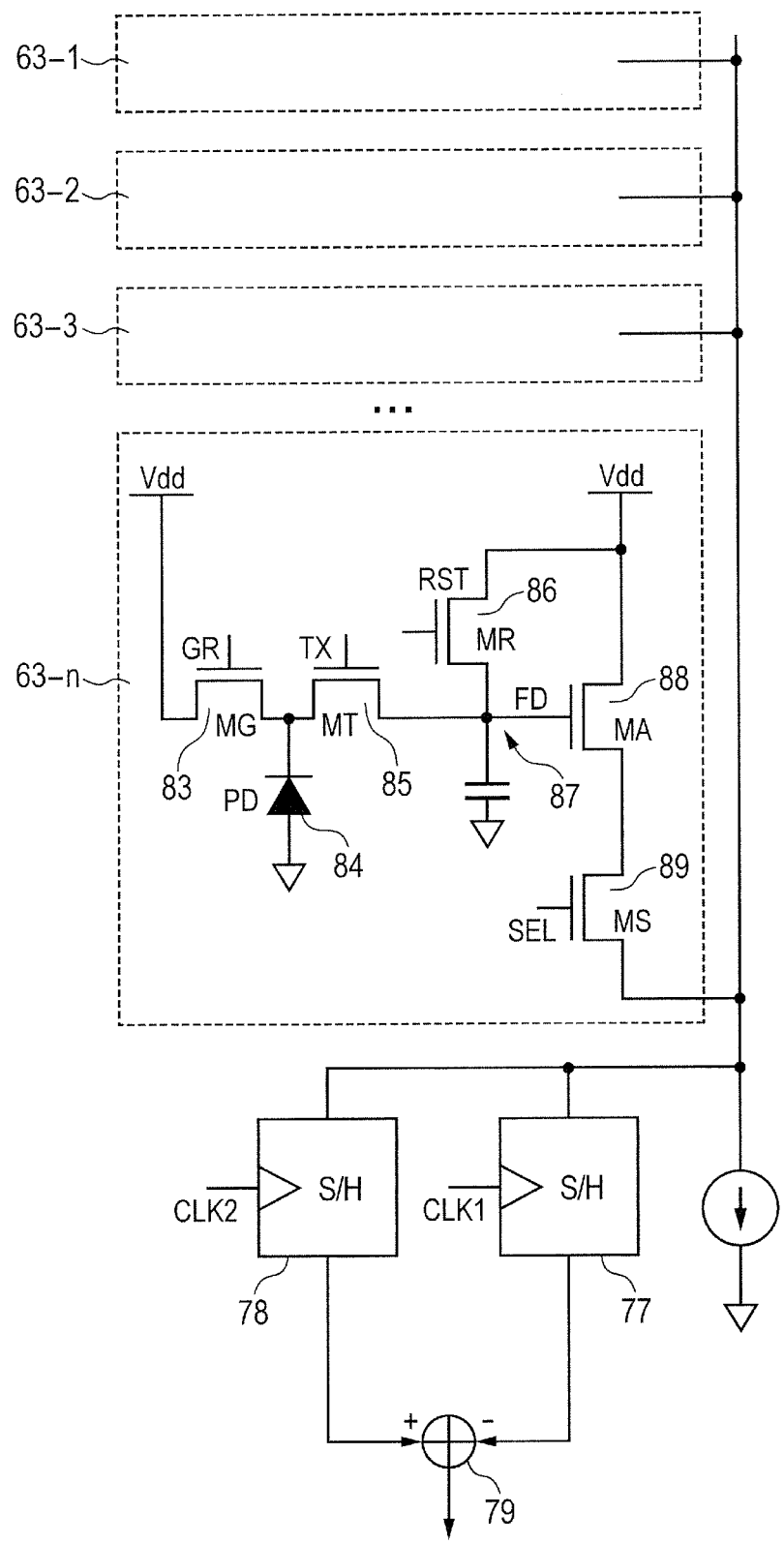
FIG. 10 is a diagram illustrating the configuration of pixels in a fourth embodiment.

FIG. 10 is a diagram illustrating the configuration of pixels in a fourth embodiment. In the fourth embodiment, in comparison to the first embodiment, a global reset transistor 83 is included in each pixel. In FIG. 10, an arbitrary column in the pixels included in the pixel array 25 is illustrated.

As illustrated in FIG. 63-n, the global reset transistor 83 included in each pixel is driven by a global reset signal GR. The source of the global reset transistor 83 is coupled to the power supply voltage Vdd. When the global reset signal GR becomes the H level, in all of the pixels, a photodiode 84 is short-circuited to the power supply voltage Vdd and the charges in the photodiode 84 are reset.

Figure 11:
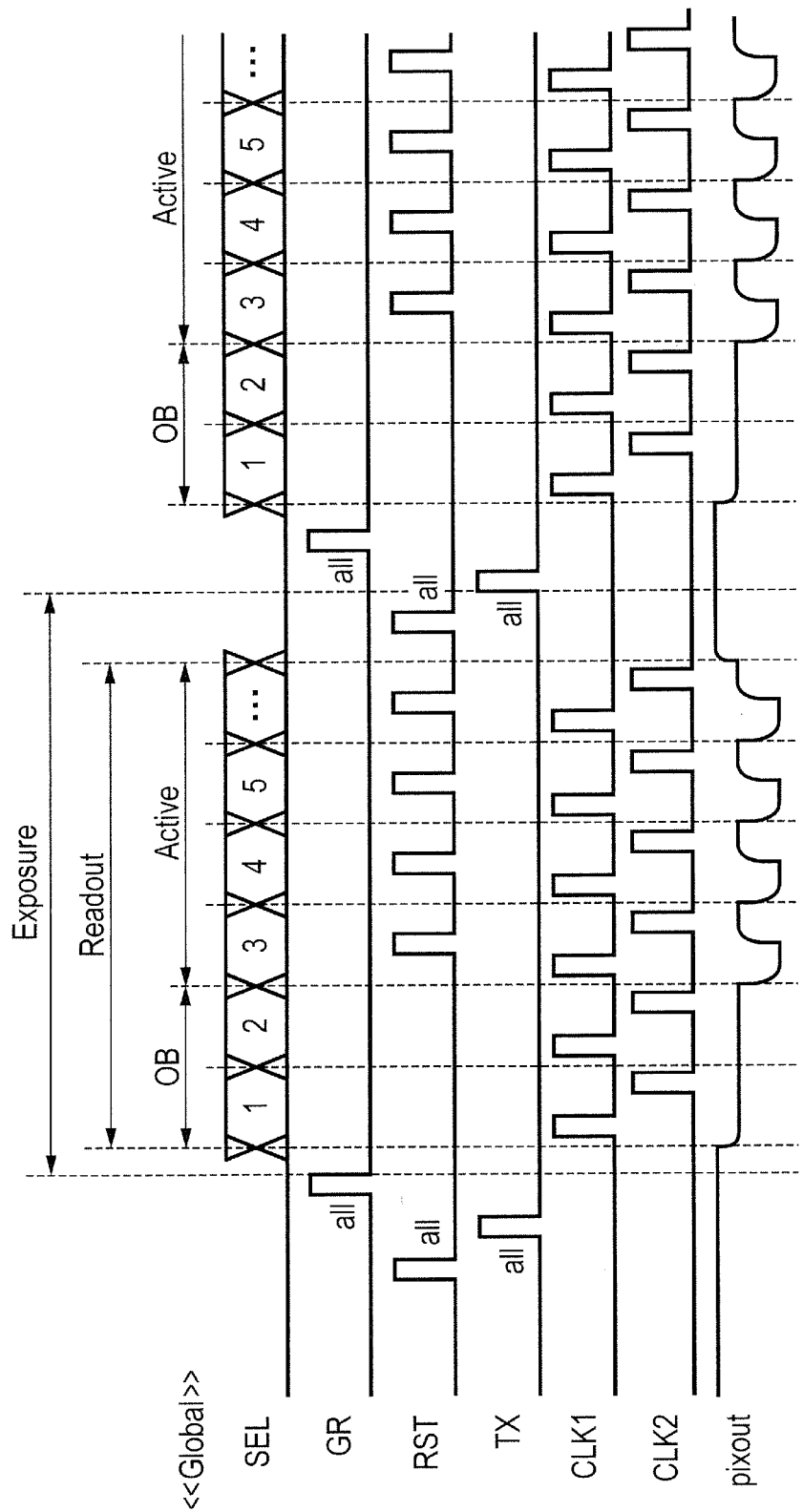
FIG. 11 is a diagram illustrating exposure control and pixel reading control in the fourth embodiment.
Figure 12:
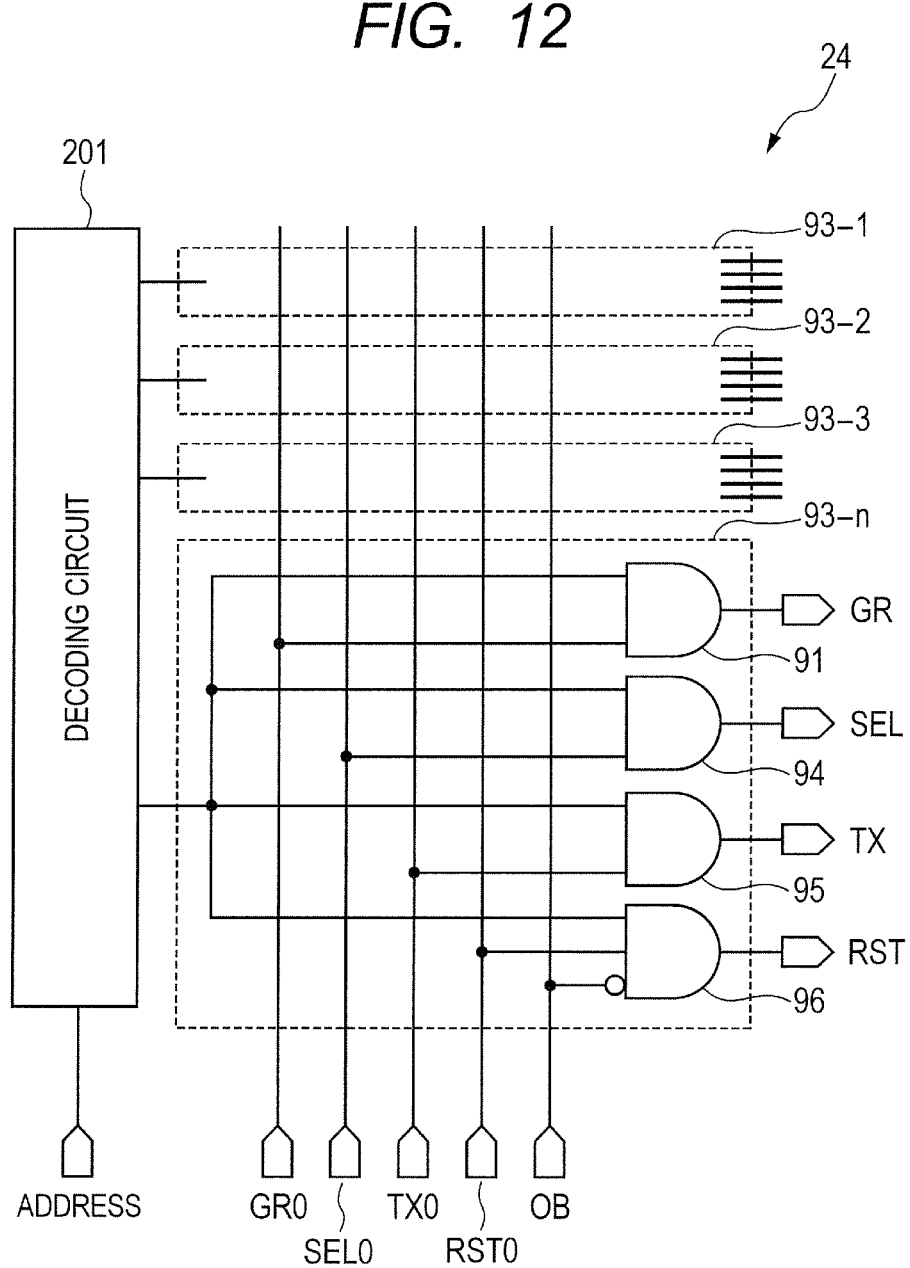
FIG. 12 is a diagram illustrating the configuration of a vertical scanning circuit 24.

FIG. 11 is a diagram illustrating exposure control and pixel reading control in the fourth embodiment. FIG. 12 is a diagram illustrating the configuration of the vertical scanning circuit 24. As illustrated in FIG. 12, in the vertical scanning circuit 24, an AND circuit unit 93 includes a global reset signal output unit 91. The global reset signal output unit 91 generates the global reset signal GR by obtaining AND between a signal indicating a result of decoding an address signal from the decoding circuit 201 and a global reset control signal GR0 supplied from the timing generating circuit 31.

As illustrated in FIG. 11, before start of the exposure period, the vertical scanning circuit 24 shifts the global reset signals GR of all of the pixels to the H level. By the operation, in all of the pixels, charges in the photodiode 84 are reset. The vertical scanning circuit 24 shifts the global reset signal GR to the L level and starts exposure.

In the exposure period, the vertical scanning circuit 24 reads signals from the pixels. Before end of the exposure period, the vertical scanning circuit 24 sets the drive signal RST to the H level for all of the pixels and supplies the resultant signal to reset the charges in the node of a floating diffusion region 87 in all of the pixels. Subsequently, the vertical scanning circuit 24 sets the drive signal TX for all of the pixels to the H level and supplies the resultant signal, so that the charges held in the photodiode 84 in all of the pixels are transferred to the floating diffusion region 87 and held in the floating diffusion region 87. The charges held in the floating diffusion region 87 are read by the vertical scanning circuit 24 in the background of the next exposure.

Summary of Fourth Embodiment

In comparison to the first embodiment, in the solid-state image sensing device and the electronic device of the fourth embodiment, by addition of the global reset transistor 83, signal according to the charges accumulated in the floating diffusion region 87 in each of the pixels can be read in the background of exposure, so that the speed of the processes can be increased.

SUMMARY

In the solid-state image sensing devices and the electronic devices described in the foregoing embodiments, by controlling reading of signals from the pixels in the pixel array 25 by the timing generating circuit 31 and the vertical scanning circuit 24, control of the supply timing of the drive signal for reducing noise caused by application of a reset signal which resets charges held in the floating diffusion region in each pixel can be performed for all of the pixels in the OB pixel region.

The solid-state image sensing device and the electronic device obtain a signal level in which noise caused by application of a reset signal is reduced from each of the pixels in the OB pixel region in the digital signal processor 26 or 30 and, by subtracting the obtained signal level from a signal level of each of the pixels in the effective pixel region, outputs an image signal in which noise such as reset noise, FPN, and shading is reduced.

Concretely, in each of the embodiments, supply of a drive signal to each pixel is controlled as follows.

(1) In the first embodiment, although the drive signal RST is applied to each of the pixels in the effective pixel region, the drive signal RST is not applied to each of the pixels in the OB pixel region.

(2) In the second embodiment, by reading a signal of each of the pixels in the OB pixel region a plurality of times, data is averaged.

(3) In the third embodiment, each of the pixels in the OB pixel region does not include a photodiode, a transfer gate (transfer transistor), and a reset transistor.

The solid-state image sensing device described in each of the embodiments can be applied to an image sensor of a global shutter type. The solid-state image sensing device described in each of the embodiments can be also used for an optical drive.

Obviously, the embodiments have been described above may be combined.

Although the present invention achieved by the inventors have been concretely described on the basis of the embodiments, obviously, the present invention is not limited to the foregoing embodiments and can be variously changed without departing from the gist.

It is to be considered that the embodiments disclosed here are illustrative and not restrictive in all respects. The scope of the present invention is defined by the scope of claims rather than the above description, and all of changes that fall within the meaning and range of equivalency of the claims are therefore intended to be embraced therein.

What is claimed is:

1. A solid-state image sensing device comprising:
 a pixel array including an OB (optical black) pixel region and an effective pixel region;
 a control circuit configured to:
  supply a drive signal to pixels in the pixel array to output signals based on voltages respectively held in the pixels, and
  supply a reset signal to pixels in the effective pixel region of the pixel array, during the supply of the drive signal, to reset voltages respectively held in the pixels;
 a signal processing unit configured to:
  receive signals of the pixels in the effective pixel region on the basis of a differences respectively between signal levels of signals output from the pixels in the effective pixel region prior to the reset signal and reset levels of signals output from pixels in the effective pixel region after the reset signal, and
  receive signals from pixels in the OB pixel region, and
  output an image signal of the pixels in the effective pixel region on the basis of the received signals of the pixels in the effective pixel region and the received signals from pixels in the OB pixel region;
 wherein the control circuit does not supply a reset signal to pixels in the OB pixel region of the pixel array during the supply of the drive signal.

2. The solid-state image sensing device according to claim 1,
 wherein each of the pixels included in the pixel array includes:
 a photoelectric converting unit generating and accumulating a charge according to an amount of light received;
 a charge holding unit receiving the charge accumulated in the photoelectric converting unit and converting the charge to a voltage; and
 a reset unit resetting the voltage of the charge holding unit in accordance with a reset signal,
 wherein the signal of the pixel is output according to the voltage of the charge holding unit in accordance with a drive signal.

3. The solid-state image sensing device according to claim 1,
 wherein each of the pixels in the effective pixel region of the pixel array includes:
 a photoelectric converting unit generating and accumulating a charge according to an amount of light received;
 a charge holding unit receiving the charge accumulated in the photoelectric converting unit and converting the charge to a voltage; and
 a reset unit resetting the voltage of the charge holding unit in accordance with a reset signal,
 wherein the signal of the pixel is output according to the voltage of the charge holding unit in accordance with a drive signal,
 wherein each of pixels in the OB pixel region of the pixel array do not include a photoelectric converting unit.

4. The solid-state image sensing device according to claim 1,
 wherein each of the pixels included in the pixel array includes:
 a photoelectric converting unit generating and accumulating a charge according to an amount of light received;
 a charge holding unit receiving a charge accumulated in the photoelectric converting unit and converting the charge to a voltage;

a transfer unit transferring the charge accumulated in the photoelectric converting unit to the charge holding unit in accordance with a drive signal; and a global reset unit resetting the charge accumulated in the photoelectric converting unit in accordance with a drive signal, wherein the control circuit is configured to:

supply a drive signal to the transfer unit with respect to all of the pixels before start of the exposure period, to transfer the charges accumulated in the photoelectric converting unit to the charge holding unit, and after the transfer, supply a drive signal to the global reset unit to reset charges in the photoelectric converting unit with respect to all of the pixels, whereby, in the exposure period, charges accumulate in the photoelectric converting unit to be transferred to the charge holding unit as a voltage and output from the pixel as a signal at a signal level.

5. An electronic device, comprising:

a processor; and a memory, a solid-state image sensing device, comprising:

a pixel array including an OB pixel region and an effective pixel region;

a control circuit configured to supply a drive signal to each of pixels in the pixel array to thereby control driving of each of the pixels and, during the supply of the drive signal, to supply a reset signal to each of the pixels in the effective pixel region but not to the pixels in the OB pixel region; and a signal processing unit configured to receive a signal from each of the pixels in the OB pixel region, receive a signal from each of the pixels in the effective pixel region, in which noise caused by application of the reset signal is reduced, and output an image signal of each of the pixels in the effective pixel region on the basis of the received signals, wherein the memory is configured to store the image signal, and wherein the processor is configured to perform an image process using the image signal stored in the memory.

\* \* \* \* \*